May 31, 1932.  R. ANDERSSON  1,860,764
DRESSING TOOL
Filed Jan. 12, 1931
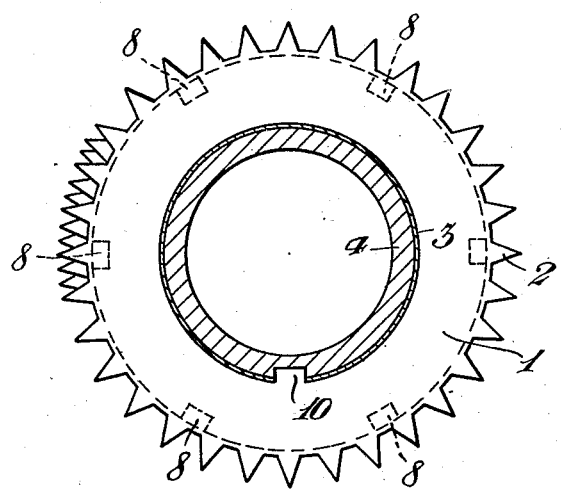
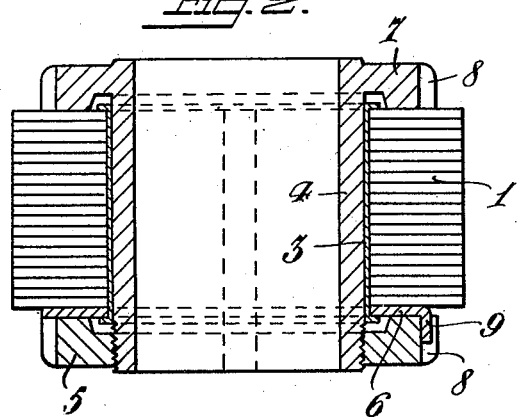

Patented May 31, 1932

1,860,764

UNITED STATES PATENT OFFICE

RUPERT ANDERSSON, OF SKARBLACKA, SWEDEN

DRESSING TOOL

Application filed January 12, 1931, Serial No. 508,353, and in Germany February 5, 1930.

This invention relates to tools utilized for dressing worn surfaces of grinding wheels, especially such grinding wheels as are used for the manufacture of wood pulp.

It is already known to use dressing tools comprising a set of flat toothed disks held in the desired position with respect to each other by an appropriate guiding means, such as a sleeve, and clamped together in the axial direction, thus forming a dressing roller which may be placed as a unitary element over a supporting spool or shell.

The object of this invention is to facilitate the assembling and dismantling of such a dressing roller. According to the invention this object may be obtained by forming the individual dressing disks with noses which are disposed in a different way on the various disks with respect to the teeth of the disks, so that with the noses of the disks in engagement with a straight notch formed in said spool or shell the teeth of the disks of the assembled dressing roller will be disposed across the surface of the roller in a predetermined way.

A dressing roller according to this invention is illustrated in the accompanying drawings in which, Fig. 1 is an end view, partly in section, and Fig. 2 is a longitudinal section of the roller.

The dressing roller shown in the drawings comprises a plurality of annular flat disks of steel or other appropriate material 1 provided at their outer periphery with dressing teeth 2, a split spool or shell 3 to receive and guide said disks 1, a bushing 4 with the associated clamping nut 5 to receive said shell with the disks, and a sealing member or washer 6. Each disk 1 is formed with an inwardly extending nose 10 at its inner periphery. The noses of the various disks are so disposed relatively to the teeth of the respective disks that the teeth of the successive disks will be disposed across the surface of the roller in a predetermined way, when the noses of the disks are in register with each other axially. In order to assemble the dressing roller the disks 1 are placed in the proper order over the split shell 3, the circumferential length of which is so chosen as to allow the noses 10 to snugly fit in the opening between the ends of the shell, that is to say, the axially extending edges of said shell will come to engage the opposite sides of the noses, as will appear from Fig. 1. The shell 3 will keep the disks in the predetermined position with relation to each other and has also for its object to hold the disks together in axial direction, until the disks are to be placed over the supporting bushing 4. To this end the ends of the shell are upset, as shown in Fig. 2. The dressing set thus assembled may then be placed over the supporting bushing 4 as a unitary element. The supporting bushing is formed with a flange 7 at one end and is screw-threaded at its opposite end to receive the nut 5 by means of which the disk set may be clamped against said flange 7. In order to facilitate the tightening of the nut 5 both said nut and said flange 7 are formed with notches 8 to receive a wrench or other appropriate tool. The sealing member or washer 6 is inserted between the nut 5 and the disk set and has for its object to hold nut 5 in place after the tightening thereof. To this end the washer is formed with one or more teeth at its outer periphery which may be bent to engage any of the notches 8 of nut 5, as shown at 9 in Fig. 2. Moreover, the washer 6 is formed with an inner nose corresponding to the noses 10 to fill the space between the ends of shell 3 in order to prevent rotation of the washer relatively to the supporting bushing 4.

In the embodiment shown the noses 10 are of such radial length as to also engage an axially extending notch formed in the bushing 4 whereby also said bushing may be utilized to hold the dressing disks in proper position.

What I claim is:—

1. A tool for dressing worn surfaces of grinding wheels, comprising in combination a supporting bushing, a shell on said bushing having a longitudinal slit, a set of flat toothed disks on said shell, said disks having inwardly directed noses to engage said slit, said shell having its ends upset to keep the disks together axially prior to the placing of the shell and disks over the bushing, a flange at one end of said bushing, a nut threaded on the opposite end of said bushing to clamp the set of disks against said flange, said nut having a notch, and a washer inserted between said nut and said set of disks, said washer being formed with a nose to engage the slit of the split shell and with a tooth to engage the notch of said nut.

2. A tool for dressing worn surfaces of grinding wheels, comprising in combination a supporting bushing, having an axial groove formed in its outer surface, a shell on said bushing having an axial slit, a set of flat toothed disks on said shell, said disks having inwardly extending noses to engage said groove and said slit, means to clamp the set of disks to said bushing in axial direction, and means for retaining said clamping means in place.

3. A tool for dressing worn surfaces of grinding wheels comprising in combination a set of flat disks having central holes formed therein and having teeth on their outer periphery, auxiliary means engaging said central holes to hold the disks together in co-axial relation to each other during conveying and mounting, coengaging elements on said first mentioned means and on said disks to hold the disks in a predetermined position in relation to each other in circumferental direction, means engaging said first mentioned means to support the set of disks when in operation, said supporting means having a rigid stop element at one end to be engaged by the set of disks and having an adjustable element on the other end to clamp the set of disks against said rigid stop element, and means to lock said adjustable element in its place on said supporting means.

In testimony whereof I have signed my name.

RUPERT ANDERSSON.